United States Patent
Paidosh (10) Patent No.: US 9,581,519 B2
(45) Date of Patent: Feb. 28, 2017

(54) FILLING IMPLANTABLE MEDICAL DEVICES FOR LEAK CHECKING

(71) Applicant: MEDTRONIC, INC., Minneapolis, MN (US)

(72) Inventor: Chris J. Paidosh, St. Anthony, MN (US)

(73) Assignee: Medtronic, Inc., Minneapolis, MN (US)

( * ) Notice: Subject to any disclaimer, the term of this patent is extended or adjusted under 35 U.S.C. 154(b) by 179 days.

(21) Appl. No.: 14/394,335

(22) PCT Filed: Mar. 1, 2013

(86) PCT No.: PCT/US2013/028636
§ 371 (c)(1),
(2) Date: Oct. 14, 2014

(87) PCT Pub. No.: WO2013/162701
PCT Pub. Date: Oct. 31, 2013

(65) Prior Publication Data
US 2015/0114092 A1    Apr. 30, 2015

Related U.S. Application Data

(60) Provisional application No. 61/639,117, filed on Apr. 27, 2012.

(51) Int. Cl.
*G01M 3/04* (2006.01)
*G01M 3/28* (2006.01)

(52) U.S. Cl.
CPC .......... *G01M 3/04* (2013.01); *G01M 3/2869* (2013.01)

(58) Field of Classification Search
CPC .............................. G01M 3/04; G01M 3/2869
See application file for complete search history.

(56) References Cited

U.S. PATENT DOCUMENTS

| | | | |
|---|---|---|---|
| 3,572,096 A * | 3/1971 | Meyer | G01M 3/229 73/40.7 |
| 4,918,974 A * | 4/1990 | Hachey | G01N 27/185 73/19.07 |
| 6,349,025 B1 | 2/2002 | Fraley | |
| 6,529,103 B1 | 3/2003 | Brendel | |
| 2006/0260713 A1 | 11/2006 | Pyszczek | |
| 2007/0234540 A1 | 10/2007 | Iyer | |
| 2008/0060418 A1* | 3/2008 | DeRoos | G01N 15/0826 73/38 |
| 2009/0312835 A1 | 12/2009 | Stevenson | |
| 2011/0004283 A1 | 1/2011 | Stevenson | |

OTHER PUBLICATIONS

PCT International Search Report and Written Opinion for International Application No. PCT/US2013/028636 dated Jul. 17, 2013 (9 pages).

* cited by examiner

*Primary Examiner* — Ryan Walsh
(74) *Attorney, Agent, or Firm* — Mueting, Raasch & Gebhardt, P.A.

(57) ABSTRACT

A method for introducing an analyte gas into a cavity of an implantable medical device includes analyzing gas that exits the cavity through an outlet in communication with the cavity and introducing an analyte gas into the cavity via an inlet in communication with the cavity until the composition of the gas exiting the cavity comprises a predetermined percent or amount of the analyte gas. The inlet and outlet may be sealed, and the device may be leak tested.

19 Claims, 8 Drawing Sheets

FILLING IMPLANTABLE MEDICAL DEVICES FOR LEAK CHECKING

RELATED APPLICATION

This application is a U.S. National Stage Application of International Application No. PCT/US2013/028636, filed Mar. 1, 2013, which was published in English on Oct. 31, 2013, International Patent Publication WO 2013/162701 A1, which claims the benefit under 35 U.S.C. 119(e) of U.S. Provisional Application No. 61/639,117, filed Apr. 27, 2012.

FIELD

The present disclosure relates to implantable medical devices; more particularly to methods and systems for verifying that implantable medical devices are hermetically sealed.

BACKGROUND

Many, if not all, active implantable medical devices are hermetically sealed so that, among other things, internal electrical components are fluidly isolated from bodily fluids of the patients when the devices are implanted. The hermetic seal of such devices is typically tested by the manufacturer.

Such testing often involves leak testing, in which the presence of a gas placed within the hermetically sealed device is detected external to the device. In some situations, a non-hermetically sealed device is placed in an environment containing the gas, such as in a helium glove box, and the housing of the device is hermetically sealed within the environment. Thus, the hermetically sealed housing is filled with the gas, such as helium, in the environment. The device is determined to not be hermetically sealed if the gas, or a threshold level of the gas, external to the device is detected during the leak testing.

Some devices may contain material that can sorb and release the gas to be detected. When such materials are located external to a hermetically sealed housing, they can interfere with leak testing. For example, if the external materials are present in the environment containing the gas, such as a helium glove box, while the housing is being hermetically sealed, the external materials may sorb the gas during sealing and later release the gas during leak testing. The release of the gas by the external material during leak testing can result in a false positive result for a leaky seal.

BRIEF SUMMARY

The present disclosure, among other things, describes systems and methods for introducing a gas into a compartment of an implantable medical device to be hermetically sealed. If the device includes gas sorbing material external to the compartment to be sealed, the systems and methods described herein allow the hermetic compartment to be filled with the gas without the gas sorbing to the external material of the device. Accordingly, when the device is leak tested, false positive results due to gas sorption by external device materials during hermetic sealing may be reduced or avoided.

In embodiments described herein, a method includes (i) providing an implantable medical device, or a portion thereof, to be hermetically sealed, the device or portion thereof forming a cavity and having an inlet and outlet in fluid communication with the cavity, wherein the device or portion thereof forming the cavity is putatively hermetically sealed except for the inlet and the outlet; (ii) analyzing gas that exits the cavity through the outlet; and (iii) introducing an analyte gas into the cavity via the inlet until the composition of the gas exiting the cavity comprises a predetermined percent or amount of the analyte gas. The method may further include putatively sealing the inlet and the outlet if the composition of the gas exiting the cavity is determined to have net or exceeded the predetermined threshold percentage or amount of analyte gas, and subjecting the device with the sealed inlet and outlet to leak testing to determine whether the device or portion thereof is hermetically sealed.

In embodiments, computer-readable medium comprising instructions that, when implemented, cause a system to carry out a method described herein.

In embodiments, a system includes a fixture for use in introducing an analyte gas into a cavity of an implantable medical device, the device or a portion thereof forming the cavity and having an inlet and outlet in fluid communication with the cavity, wherein the fixture comprises a first gas line coupling member; and a second gas line coupling member. The fixture is configured to sealingly engage the device, to fluidly couple the inlet to the first gas line coupling member, and to fluidly couple the outlet to the second gas line coupling member. The system further includes a gas analyzer operably coupleable to the second gas line coupling member. The system may also include a source of analyte gas operably coupleable to the first gas line coupling member. The system may have electronics operably coupled to the gas analyzer, wherein the electronics are configured to determine whether the percentage or amount of the analyte gas in gas exiting the device outlet meets or exceeds a predetermined threshold based on data from the gas analyzer.

In embodiments, the fixture includes a (i) plate member; (ii) a first bore in the plate member, wherein the first bore is configured to be aligned with the device inlet; (iii) a second bore in the plate member, wherein the second bore is configured to be aligned with the device outlet; (iv) a first sealing member disposed on or in the plate member and axially disposed about an opening in the plate forming the first bore; (v) a second sealing member disposed on or in the plate member and axially disposed about an opening in the plate forming the second bore; (vi) a laser transparent window sealingly engaging a portion of the plate, wherein the window is disposed on an opposing side of the first and second bores relative to the first and second sealing members, wherein the window permits the passage of laser energy through the plate via the first and second bores; (vii) a first gas line coupling member in fluid communication with the first bore; and (viii) a second gas line coupling member in fluid communication with the second bore.

One or more embodiments of the devices, systems and methods described herein may provide one or more advantages over prior devices, systems and methods. Such advantages will be readily understood from the following detailed description when read in conjunction with the accompanying drawings.

The schematic drawings are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to".

Any direction referred to herein, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

As used herein, "providing" an article in the context of the present claims means purchasing, manufacturing, assembling, or otherwise obtaining the article.

The present disclosure describes, among other things, systems and methods for introducing a gas into a compartment of an implantable medical device to be hermetically sealed. The hermetic seal of the device may be evaluated by leak testing the device in which the presence of the gas external to the device is detected. If the device includes gas sorbing material external to the compartment to be sealed, the systems and methods described herein allow the hermetic compartment to be filled with the gas without the gas sorbing to the external material of the device. Accordingly, when the device is leak tested false positive results due to gas sorption by external device materials during hermetic sealing may be reduced or avoided. Of course, the methods san systems described herein may be employed regardless of whether the device has such external gas sorbing material.

The teachings described herein apply to any implantable medical device having a hermetically sealed compartment. Examples of such implantable devices include signal generators such as cardiac pacemakers or defibrillators, neuromodulators (such as spinal cord stimulators, brain or deep brain stimulators, peripheral nerve stimulators, vagal nerve stimulators, occipital nerve stimulators, subcutaneous stimulators, etc.), gastric stimulators; cochlear implants; sensing or monitoring devices; infusion devices for delivering therapeutic agents; or the like.

Figure 1:
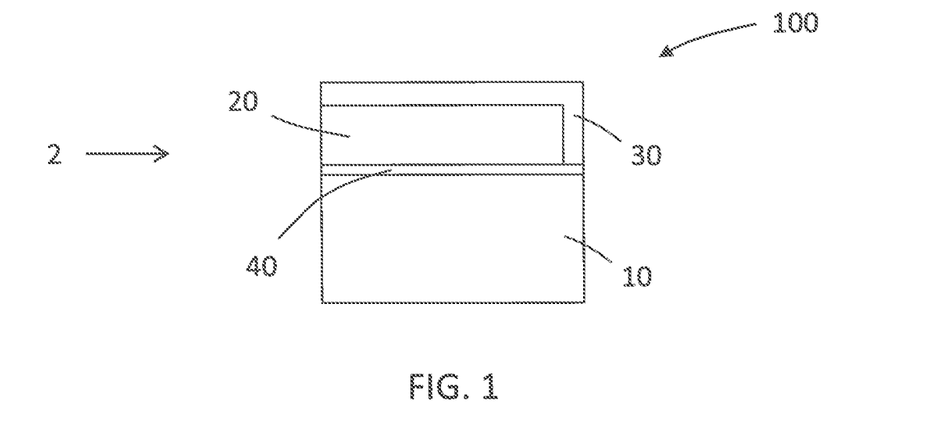
FIG. 1 is a schematic drawing of a side view of an embodiment of an implantable medical device.
Figure 2:
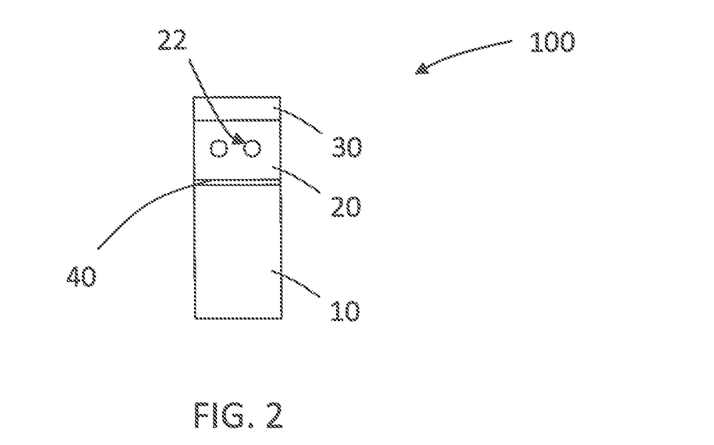
FIG. 2 is a schematic drawing of a front view of an embodiment of the implantable medical device of FIG. 1 when viewed in direction of arrow 2 of FIG. 1.

By way of example and with reference to FIGS. 1-2, schematic drawings of an embodiment of an implantable device 100 are shown. The device 100 includes a feedthrough plate 40 attached to a housing 10. Feedthrough plate 40 and housing 10 together form a hermetically sealed cavity, in which various electronic components are disposed. Feedthrough plate 40 is part of a feedthrough assembly that allows for electrical connection between electronics disposed with the hermetically sealed cavity and components of the device that are external to the hermetically sealed cavity. In the depicted embodiment, a telemetry antenna assembly 30 is disposed external to the hermetically sealed housing 10 and, a telemetry antenna of the assembly 30 is electrically coupled to the electronics through a feedthrough of the feedthrough assembly.

The device 100 also includes lead receptacles 22 formed in a header 20 connected to feedthrough plate 40. The lead receptacles 22 are configured to receive leads and contain internal contacts that electrically couple the leads to the electronics of the device. The internal contacts of the lead receptacles 22 are operably coupled to the electronics via feedthroughs of the feedthrough assembly.

The telemetry assembly 30 or components of the header 20 may include materials that can sorb gasses that may be used for leak testing. For example, the telemetry antenna assembly 30 may include an outer covering of silicone, polyurethane, or the like that can sorb gasses such as helium. By way of further example, the header 20 may be backfilled with, e.g., medical adhesive, which can also sorb and release such gasses. Regardless of the source or composition of the analyte gas-sorbing and -releasing materials, if such materials are present during hermetic sealing of the device, or a portion thereof (e.g., cavity defined between housing and feedthrough plate), then sealing in an open environment containing the analyte gas (e.g., such as a helium glove box or other gas environment) may interfere with leak testing due to sorption of the analyte gas by the sorbing materials. Such materials may then release the analyte gas during leak testing resulting in a false positive leak determination.

One way to avoid such sorption has been to assemble or attach components containing sorbing materials after the appropriate portion of the device has been hermetically sealed. However, when it is not possible, practicable or desirable to assembly such components after hermetic sealing, a process for filling the device, or portion thereof, with analyte gas other than hermetically sealing under an environment containing the analyte gas, such as in a glove box or the like, should be used.

Described herein below are processes, components, systems and devices configured to accomplish introduction of an analyte gas into a device, or portion thereof, so that the device may be leak tested for integrity of a hermetic seal. Before describing such components, methods, devices and systems in detail, reference is made to FIG. 3 in which an embodiment of a feedthrough assembly 45 and housing 10 are shown.

Figure 3:
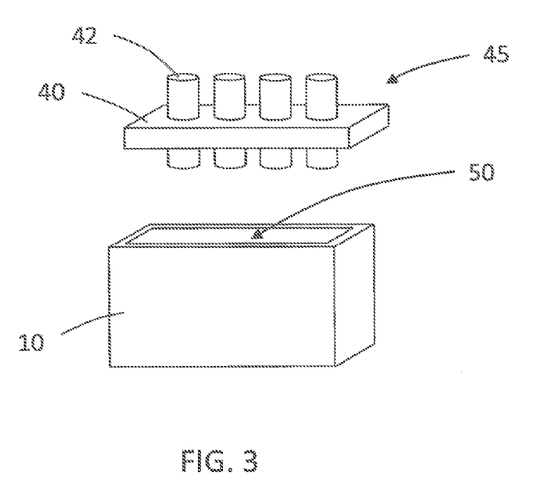
FIG. 3 is a schematic drawing of an embodiment of a housing and feedthrough assembly of an implantable medical device.

In FIG. 3, the feedthrough assembly 45 includes plate 40 and feedthroughs. The plate 40 may be hermetically sealed relative to housing 10 to form a hermetically sealed cavity 50, in which electronically components of the device may be placed. As indicated above, the plate 40 may be welded or otherwise sealed relative to housing 10 in an analyte gas environment if little or no analyte gas sorbing materials are present exterior to the cavity 50. However, when such materials are present as a part of the device exterior to the cavity 50, an alternative process for introducing analyte gas into the cavity 50 may be desirable.

Figure 4:
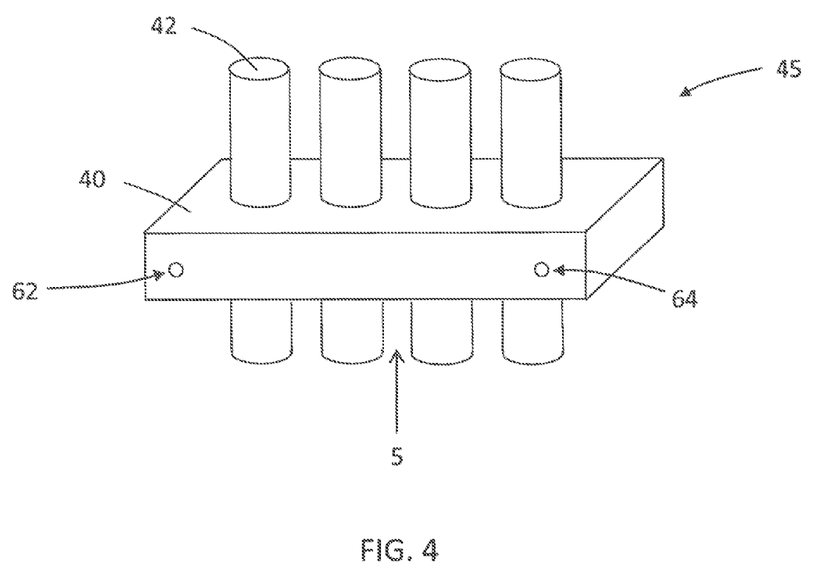
FIG. 4 is a schematic drawing of an embodiment of a feedthrough assembly.
Figure 5:
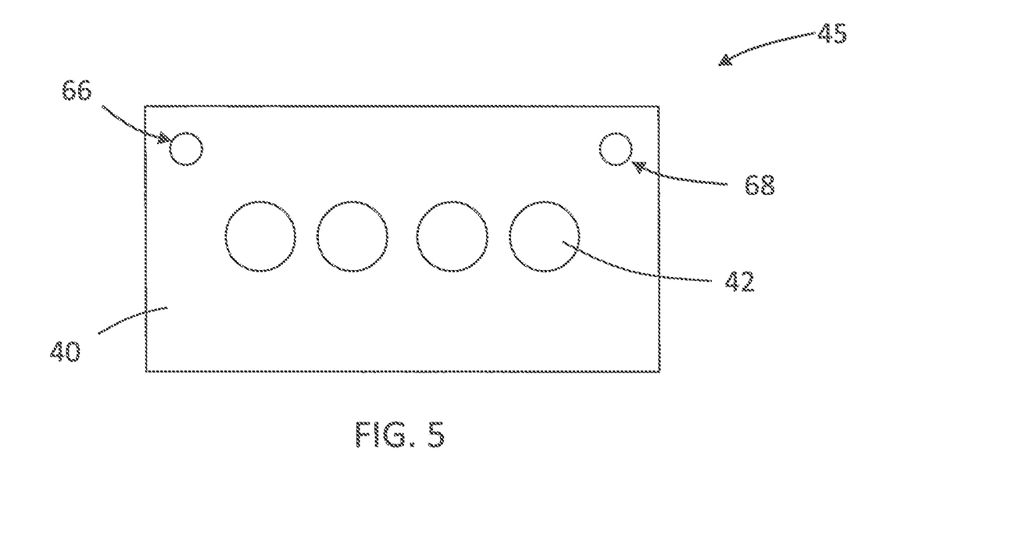
FIG. 5 is a schematic drawing of a bottom-up view of an embodiment of the feedthrough assembly of FIG. 4 when viewed in the direction of arrow 5 of FIG. 4.

Referring now to FIGS. 4-5, an embodiment of a feedthrough assembly 45 that allows for an alternative analyte filling procedure is shown. As with the assembly shown in FIG. 3, the feedthrough assembly 45 shown in FIGS. 4-5 includes a feedthrough plate 40 through which feedthroughs 42 hermetically project. The assembly 45 shown in FIGS. 4-5 also includes first 62 and second 64 side openings in the plate 40 that serve as an inlet and outlet for analyte gas to enter and exit cavity (see, e.g., cavity 50 in FIG. 3) of the device formed in part by the assembly 45. The first 62 and second 64 openings are bored through a solid portion of plate 40 and are in communication with cross-bores 66, 68 (see FIG. 5), which allow openings 62, 64 to communicate with the cavity when the plate 40 is sealed to the housing (see, e.g., housing 10 in FIG. 3); e.g., via welding.

After the feedthrough assembly 45 is welded or otherwise sealed to the housing the cavity will be hermetically sealed except for the presence of the openings 62, 64. An analyte gas may be introduced into the cavity through inlet or opening 62 and gas displaced from the cavity may exit outlet or opening 64. When the cavity is filled with a sufficient or desired amount of analyte gas, the openings 62, 64 may be sealed to completely hermetically seal the cavity. The openings 62, 64 may be sealed in any suitable manner.

In many embodiments, the plate 40 is formed of a metal, such as titanium or a titanium alloy, and openings 62, 64 may be sealed by laser welding. Preferably, openings 62, 64 are sufficiently small such that metal of the plate 40 surrounding the openings 62, 64 reflows and seals the openings during laser welding. Further, it is preferred that the bores in communication and axially aligned with the openings 62, 64 terminate in a portion of the plate 40 where sufficient plate material exists to prevent laser energy from laser welding from reaching a sensitive electrical component of the feedthrough assembly 45 or device. For example, bores forming openings 62, 64 are generally perpendicular to bores forming openings 66, 68 and thus the pathway through the plate 40 is non-linear. As such, laser energy directed at openings 62, 64 will impinge on plate material at the point of intersection of the bores rather than being directed straight through openings 66, 68.

By way of example, openings 62, 64 formed from cross drilling in a titanium plate 40 and having a diameter of between about 0.25 mm and about 0.45 mm are of a suitable size for sealing by laser welding via reflow of the metallic plate material.

In embodiments, openings 66, 68 are larger in diameter than openings 62, 64. Of course, openings 66, 68 may be the same size or smaller than openings 62, 64.

Of course, the openings that provide fluid access to the cavity may be located in any suitable location and need not be located on the feedthrough assembly plate (and some implantable devices may not include a feedthrough assembly). For example and with reference to FIG. 6, the openings 62, 64 may be formed in the housing 10 of the device 100 or elsewhere as desired or practicable. If laser welding is used to seal the openings 62, 64 (e.g., if housing is metal, such as titanium, titanium ahoy, or the like) after introduction of analyte gas into the cavity, it is desirable that the openings be positioned such that laser energy does not impinge on sensitive electrical components within the housing 10. A backing (not shown), which may be the housing material or another material, may be placed behind the openings 62, 64, or the openings may be in communication with a non-linear pathway to the cavity, to prevent laser energy from reaching sensitive internal components.

Figure 6:
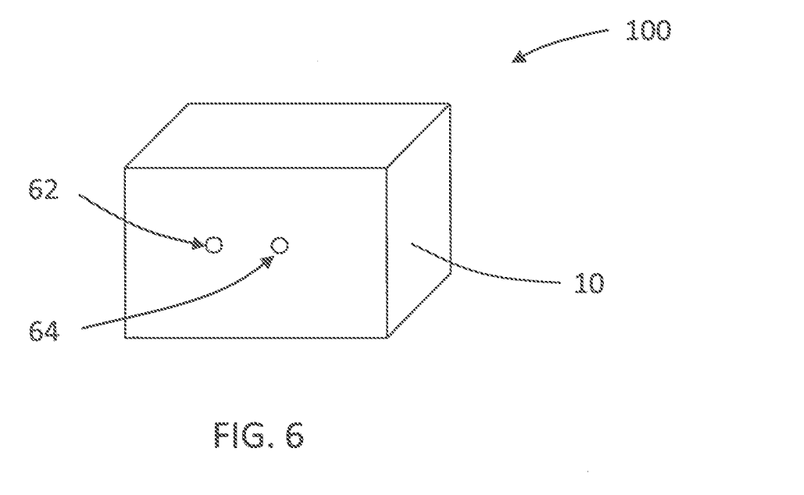
FIG. 6 is a schematic drawing of an embodiment of an implantable medical device showing inlet and outlet openings for introduction and exhaust of analyte gas into or out of a cavity of the device.

After a sufficient or desired amount of analyte gas is introduced into the cavity and the openings 62, 64 are sealed, the device may be subjected to leak testing to determine whether the analyte gas leaks from the cavity.

Referring now to FIGS. 7-11, schematic diagrams illustrating overviews of systems that may be employed to carry out the processes described herein are shown. While not shown, it will be understood that one or more valves or exhaust vents may be present to control the flow of gas through the system as needed or desired. In the embodiments depicted in FIGS. 7-11, a source of analyte gas 210 is coupled to inlet 62 of implantable medical device 100, and a gas analyzer 220 is coupled to outlet 64 of implantable medical device 100. Any suitable gas analyzer 220 to determine the composition of gas, the percent of analyte gas, or the like, exiting the device 100. Suitable gas analyzers include thermal conductivity based gas analyzers, such as those available from GOW-MAC® Instrument Co, (Bethlehem, Pa.), gas chromatography (GC)-mass spectrophotometry (MS) instruments, or the like. GC-MS instruments may include any suitable detector, such as a discharge ionization detector, a thermal conductivity detector, a flame ionization detector, a photoionization detector, a flame photometric detector, or the like.

The analyte gas source may contain any suitable analyte gas or combination of gases. For example, the analyte gas may include helium, argon, nitrogen, helium/nitrogen, helium/argon, or the like. The gas analyzer may be configured or calibrated to detect the analyte gas employed.

Figure 7:
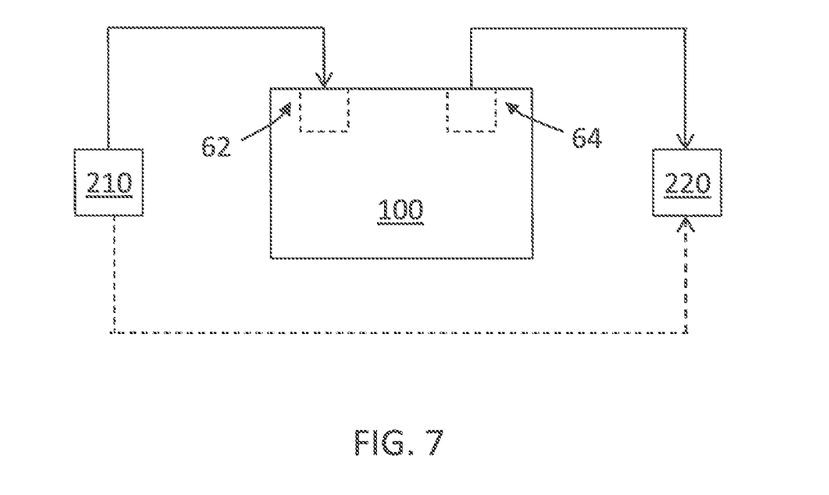
FIGS. 7-11 are schematic diagrams of embodiments of systems for introducing an analyte gas into a cavity of an implantable medical device.

As shown in FIG. 7, the analyte gas source 210 may be operably coupled to the gas analyzer 220; e.g. via gas line or tubing (shown as dashed line), so that the gas analyzer may be calibrated for detection of the analyte gas. Alternatively, as shown in FIGS. 8-11, a separate reference analyte gas source 215 may be coupled to the gas analyzer for purposes of calibration or verification that the analyzer 220 is functioning properly.

Figure 8:
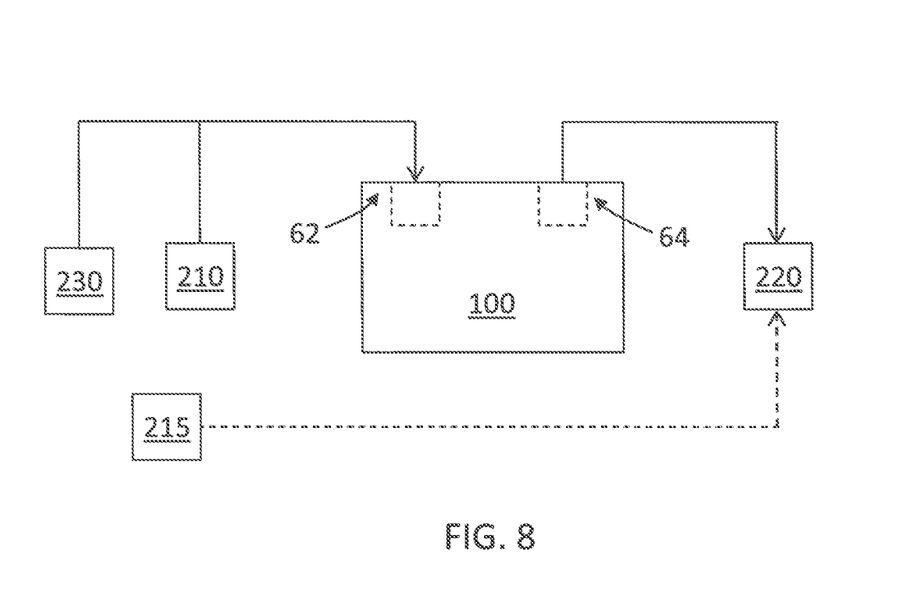
Figure 9:
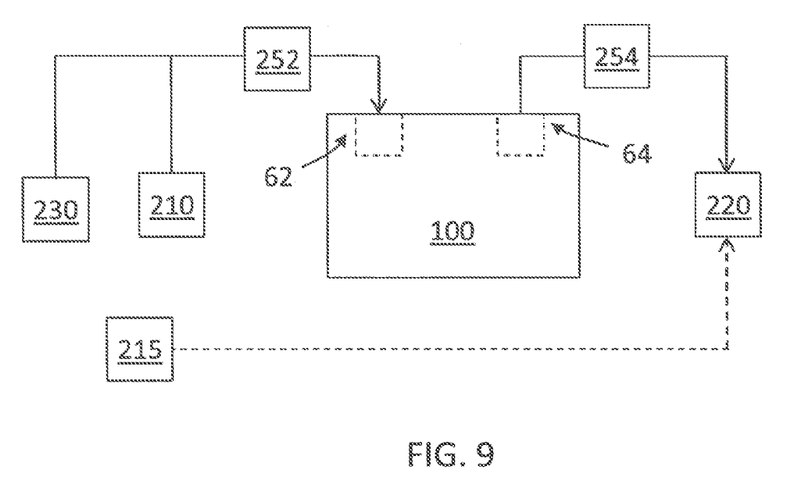

As shown in FIG. 8, the system may include an air source 230 for introducing air into the device 100. The air may be used as an initial check to verify that the gas analyzer 220 is properly functioning before introducing the analyte gas from source 210 into the device 100. Further, as shown in FIG. 9, the system may include meters 252, 254 for measuring gas flow or mass upstream (252) or downstream (254) of the implantable device 100. Data from the meters 252, 254 may be used to determine whether any leaks exist in the system.

In embodiments where meters 252, 254 are flow meters, the flow rates measured by meter 252 and 254 may not be equal due to a pressure drop generated between the inlet 62 and outlet 64. The pressure drop is a function of the pressure of the supply (e.g., supply 210 or supply 230) and may readily be accounted for in determining whether a system leak exists.

Figure 10:
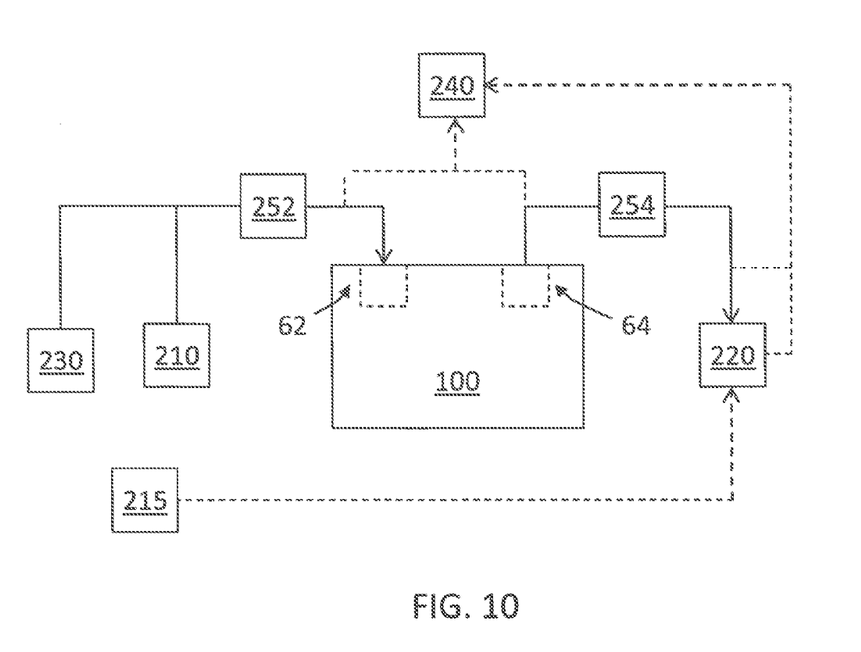

Referring now to FIG. 10, the system may include one or more vacuum apparatus 240 (only one shown), such as a vacuum pump and reservoir, configured to pull a vacuum at any suitable location (indicated by dashed lines) upstream or downstream of device 100. It will be understood that vacuum 240 may be operably coupled to a line or component at any suitable location other than, or in addition to, those shown. One or more valves (not shown) may be employed to control the location of the vacuum effects. In embodiments, vacuum 240 is used to test the systems for leaks. When vacuum 240 is applied to a closed system, a system free of leaks should maintain the vacuum over time. Vacuum apparatus 240 may include a vacuum gauge that may be employed to assist in determining vacuum level over time.

In embodiments, vacuum 240 is used to evacuate the cavity of the device 100 prior to filling with analyte gas.

In embodiments, a vacuum is pulled downstream of the gas analyzer 220 while analyte gas from source 210 is introduced into a cavity of device 100 via inlet 62. Such a configuration may assist in initial filling of device 100 with analyte gas while allowing analysis of gas content exiting the device 100. This optional step, or variations thereof (e.g., vacuum upstream of gas analyzer 220 but downstream of outlet 64) may be performed as long as desired or until the analyte gas reaches a predetermined threshold amount or percentage. By way of example, if the analyte gas is helium, it may be desirable to pull helium through the device 100 from source 210 with vacuum 240 until the percent of helium in the gas composition detected by analyzer 220 is greater than or equal to about 40% or about 50%.

Analyte gas may be pushed through the device 100 via source 210 without use of vacuum 240. In this case, the system is vented (exhaust vent opened not shown) to allow flow of analyte gas. Preferably the system is vented downstream of the analyzer 220 so that the composition of gas exiting the device 100 via outlet 64 may be monitored. In embodiments, analyte gas is pushed through the device 100 without use of vacuum 240 following a threshold amount or percentage of analyte gas being detected by analyzer 220 when the vacuum is employed to pull the analyte gas through the device 100. Analyte gas may be pushed through the device 100 as long as desired or until the analyte gas reaches a predetermined threshold amount or percentage. By way of example, if the analyte gas is helium, it may be desirable to push helium through the device 100 from source 210 until the percent of helium in the gas composition detected by analyzer 220 is greater than or equal to about 95%, such as greater than or equal to about 98% or greater than or equal to about 98.5%.

In embodiments, the main system exhaust vent (not shown) is closed while the analyte gas source 210 remains open and in communication with inlet 62. In this "hold" state, the gases within the system will equilibrate. Analyte gas within the system may be analyzed by gas analyzer 220 in this state. If the percentage or amount of analyte gas reaches or maintains a threshold percent, the inlet 62 and outlet 64 may be sealed. By way of example, if the analyte gas is helium, the inlet and outlet may be sealed if the gas composition detected by analyzer 220 is greater than or equal to about 98%, such as greater than or equal to about 98.5% or greater than or equal to about 99%.

Figure 11:
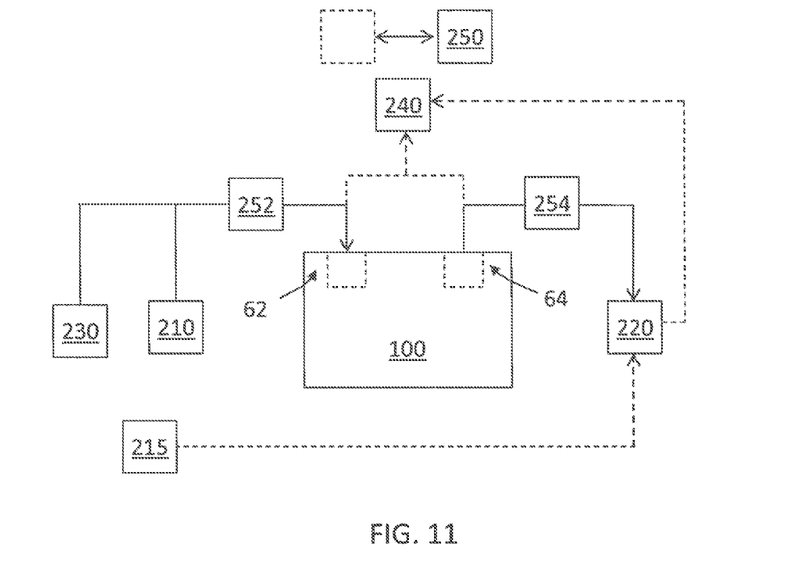

Referring now to FIG. 11, the system may include a laser welder 250 for sealing inlet 62 and outlet 64. The laser source of laser welder 250 is moveable relative to device 100 such that energy may be directed at or around inlet 62 and outlet 64 to seal the inlet and outlet. In some embodiments, as described above, the inlet 62 and outlet 64 comprise openings in the device, or portion thereof, which are in fluid communication with a cavity into which analyte gas is introduced. The openings are sufficiently small such that welding causes the material surrounding the opening to reflow and seal the opening. By way of example, the material into which the openings are formed may be metallic material, such as titanium or a titanium alloy.

Preferably, the inlet 62 and outlet 64 are sealed or welded; e.g. via laser 250, while the device 100 is maintained within the sealed system. This can be accomplished in any suitable manner. By way of example and as described in more detail below, laser 250 may direct energy through a laser transparent sealed window, such as a fused silica window, while inlet 62 and outlet 64 are sealingly coupled to a gas lines or tubes of the system. Analyte gas from lines or tubes may be vented or vacuumed from lines or tubes after the inlet 62 and outlet 64 are sealed and prior to removing device 100 from the system. Venting or vacuuming analyte gas lines from lines or tubes can prevent analyte gas from contacting external components of the device, which may be gas-sorbing components.

In embodiments, the outlet 64 is sealed or welded before the inlet 62 is sealed or welded. By sealing the outlet 64 before the inlet 62, positive pressure from source 210 may be maintained. In embodiments, the device 100 (or chamber into which analyte gas has been introduced) is vented to or towards atmospheric pressure before the inlet 62 is welded or sealed. Such venting may be desirable in circumstances where increased pressure within the device causes the device to expand or balloon in size.

While not shown, it will be understood that one or more components or processes shown in or discussed with regard to FIGS. 7-11 may be automated. That is, one or more components may be operably coupled to electronics, such as a processor and memory, for system operations. The memory, which may be non-transitory memory such as RAM, ROM, EPROMM, etc., may contain instructions for the processor to carry out or to cause the various components to carry out system operations, such as those described herein above or below.

Figure 12A:
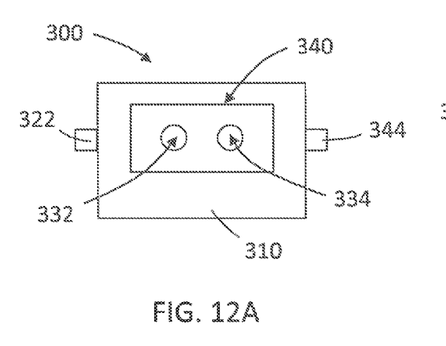
FIG. 12A is a top view of an embodiment of a fixture for use in introducing an analyte gas into a cavity of an implantable medical device.
Figure 12B:
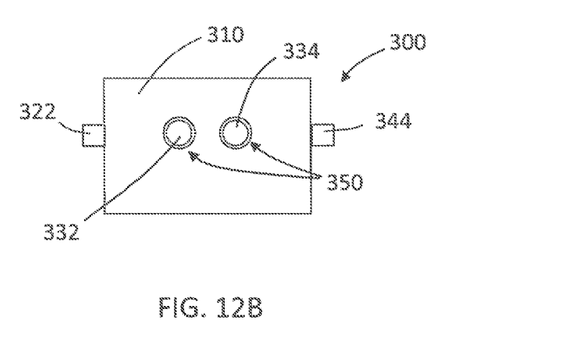
FIG. 12B is a bottom view of an embodiment of the fixture of FIG. 12A.

Referring now to FIGS. 12A-B, schematic drawings of an embodiment of a fixture 300 for use in a system as described above is shown. In FIG. 12A a top-down view is shown. In FIG. 12B a bottom-up view is shown. The fixture 300 is configured to sealingly engage the inlet and outlet of an implantable device (e.g., inlet 62 and outlet 64 of device 100 shown in FIGS. 7-11) and independently place the inlet and outlet in communication with a source of analyte gas (e.g., source 210 in FIGS. 7-11) and gas analyzer (e.g., analyzer 220 in FIGS. 7-11), respectively.

The fixture 300 includes a housing or plate 310 into which bores 332, 334 are formed. Bore 332 is configured to be generally aligned with the inlet of the implantable device, and bore 334 is configured to be generally aligned with the outlet of the implantable device. Sealing elements 350, such as o-rings, are disposed about and generally axially aligned with the bores 332, 334. The sealing elements 350 sealingly engage the implantable device when the fixture 300 is pressed against the device and place bore 332 in sealed communication with the inlet and bore 334 in sealed communication with the outlet.

The fixture 300 also includes a window 340, such as a laser transparent fused silica window, which permits sealing of the inlet and outlet openings of the implantable medical device while the fixture remains sealed about the inlet and outlet openings (via seal elements 350). By way of example, a laser (such as laser 250 in FIG. 11) may be positioned over the window to seal (e.g. via welding) openings in an implantable medical device underlying bores 332, 334 of fixture 300.

The fixture also includes gas line or tube couplings 322, 344 for connection to gas lines in communication with, for example, a gas source (such as source 210 of FIGS. 7-11) or a gas analyzer (e.g., analyzer 220 of FIGS. 7-11). A bore or other passageways (not shown) intersecting bore 332 places a coupling 322 in fluid communication with bore 332. A bore or other passageways (not shown) intersecting bore 334 places a coupling 344 in fluid communication with bore 334.

It will be understood that fixture 300 depicted in FIGS. 12A-B is only an example of a fixture that may be employed in a system as depicted in, for example, FIGS. 7-11 and that any other suitable fixtures or combinations of fixtures may be employed to allow the methods described herein to be carried out.

Figure 13:
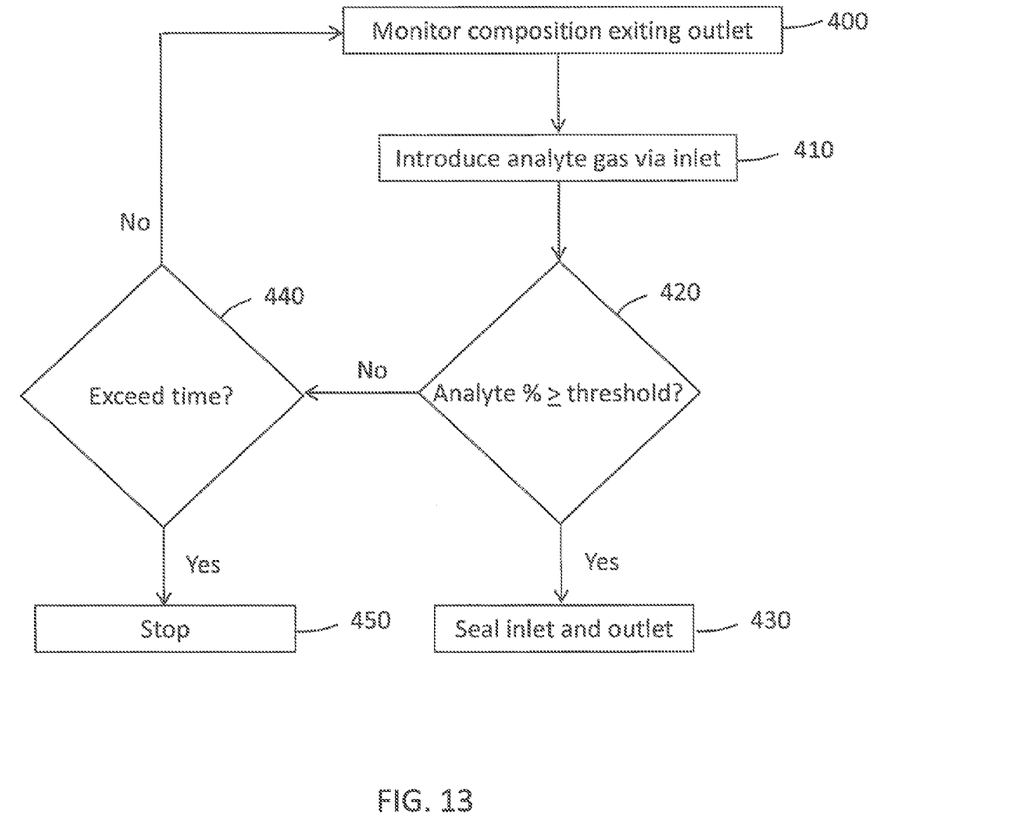
FIGS. 13-14 are flow diagrams illustrating overviews of methods described herein.

Referring now to FIG. 13 an overview of a method for introducing an analyte gas into a cavity of a device, or portion thereof, is shown. The device has an inlet and an outlet in communication with the cavity into which the analyte gas is to be introduced, e.g. as described above. The inlet is in communication with a source of analyte gas, such as pressurized helium, or the like. The outlet is in communication with a gas analyzer. The method includes monitoring the composition of gas exiting the device outlet (400) and introducing the analyte gas into the cavity via the inlet (410). A determination is made as to whether the analyte gas exceeds a predetermined threshold (420). If the analyte gas percent meets or exceeds the threshold, the inlet and outlets are sealed (430) and the device may be subjected to leak testing. If the analyte gas percent does not reach or exceed the threshold, a determination may be made as to whether a predetermined amount of time has passed (440). If the predetermined amount of time has not yet passed, the process is continued. If the predetermined amount of time has passed without the percentage of analyte gas meeting or exceeding the threshold, the process is stopped (450). If the process is stopped (450) the system or device may be checked to determine why the threshold analyte gas percentage was not reached. For example, the device or system may include a leak.

Figure 14:
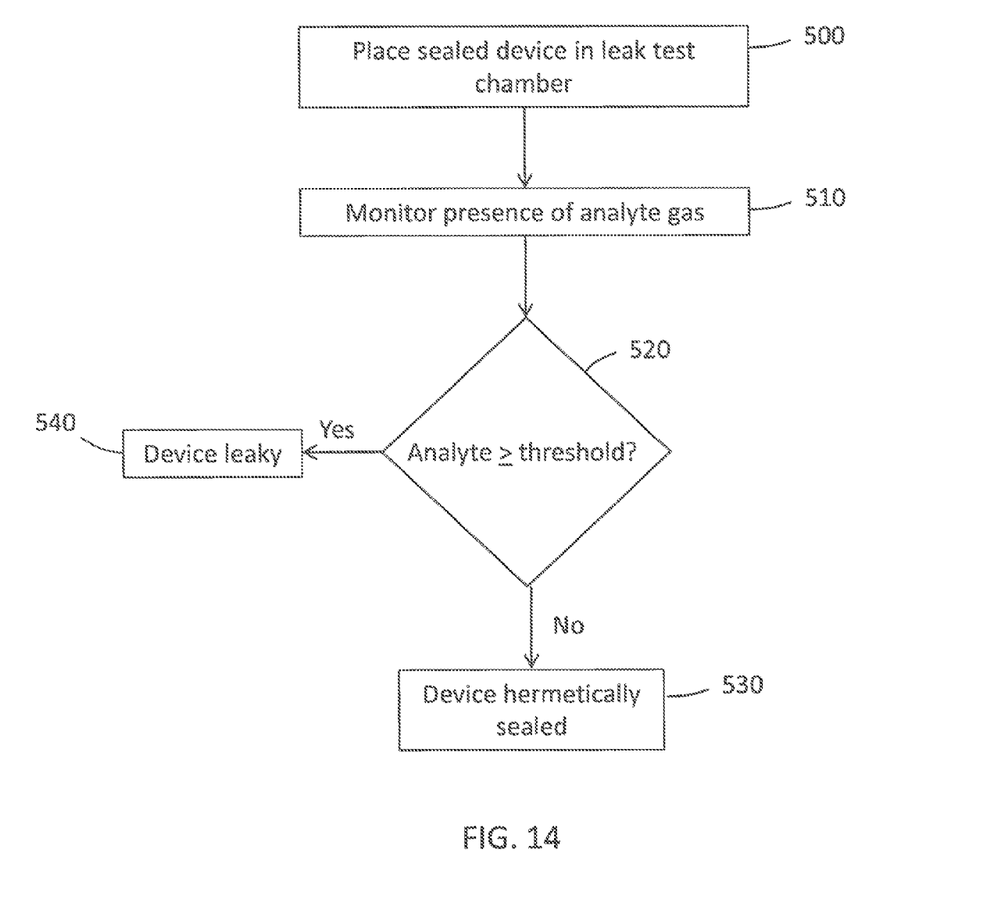

Referring now to FIG. 14, an overview of a method for leak checking a device is shown. A sealed device having an analyte gas is placed in a leak test chamber (500). The chamber is in communication with a gas analyzer (such as a GC-MS instrument), which can monitor for the presence of analyte gas external to the device (510). If the gas analyzer detects the analyte gas or an amount or percentage of analyte gas exceeding a threshold (520), the device is considered to contain a leak and not to be hermetically sealed (540). If the analyte gas is not detected or does not reach threshold amounts or percentages, the device is considered to be hermetically sealed (530).

Various embodiments of devices, systems and methods are described herein. Various aspects of some of the devices, systems and methods are summarized below.

In a first aspect, a method includes (i) providing an implantable medical device, or a portion thereof to be hermetically sealed, the device or portion thereof forming a cavity and having an inlet and outlet in fluid communication with the cavity, wherein the device or portion thereof forming the cavity is putatively hermetically sealed except for the inlet and the outlet; (ii) analyzing gas that exits the cavity through the outlet; and (iii) introducing an analyte gas into the cavity via the inlet until the composition of the gas exiting the cavity comprises a predetermined percent or amount of the analyte gas.

A second aspect is a method of the first aspect, wherein analyzing the gas that exits the cavity through the outlet comprises monitoring the composition of the gas via an instrument that measures thermal conductivity of the gas.

A third aspect is a method of the first or second aspect, further comprising putatively sealing the inlet and the outlet if the composition of the gas exiting the cavity is determined to have met or exceeded the predetermined threshold percentage or amount of analyte gas.

A fourth aspect is a method of the third aspect, wherein the outlet is sealed while the inlet is in communication with a source of the analyte gas.

A fifth aspect is a method of the third or fourth aspect, wherein the inlet and the outlet are sealed via laser welding.

A sixth aspect is a method according to any of aspects 3-5, further comprising subjecting the device with the sealed inlet and outlet to leak testing to determine whether the device or portion thereof is hermetically sealed.

A seventh aspect is a method according to the sixth aspect, wherein the leak testing comprises monitoring for the presence of the analyte gas external to the device.

An eighth aspect is a method according to any of the preceding aspects, further comprising (i) monitoring flow of gas upstream of the inlet; (ii) monitoring flow of gas downstream of outlet; and (iii) determining whether the flow of gas downstream of the outlet is within a predetermined range of the flow of gas upstream of the inlet.

A ninth aspect is a method according to the eighth aspect, further comprising stopping the introduction of the analyte gas into the cavity if the flow of gas downstream of the outlet is not within a predetermined range of the flow of gas upstream of the inlet.

A tenth aspect is a method according to any of the preceding aspects, further comprising (i) determining whether the analyte gas has been introduced into the cavity via the inlet for a predetermined amount of time; and (ii) stopping the introduction of the analyte gas into the cavity if the predetermined amount of time has been determined to have passed and if the composition of the gas exiting the cavity does not comprise the predetermined percent or amount of the analyte gas.

An eleventh aspect is a non-transitory computer readable medium comprising instructions that, when implemented, cause a system to carry out a method according to any one of the preceding claims, wherein the system comprises: (i) a source containing the analyte gas; (ii) a gas analyzer; (iii) an optional first gas flow meter configured to be positioned upstream of the device inlet; (iv) an optional second gas flow meter configured to be positioned downstream of the device outlet; and (v) an optional laser to weld the inlet and the outlet to seal the inlet and the outlet.

A twelfth aspect is a system that includes a fixture for use in introducing an analyte gas into a cavity of an implantable medical device, the device or a portion thereof forming the cavity and having an inlet and outlet in fluid communication with the cavity, the fixture comprising: (i) a plate member; (ii) a first bore in the plate member, wherein the first bore is configured to be aligned with the device inlet; (iii) a second bore in the plate member, wherein the second bore is configured to be aligned with the device outlet; (iv) a first seating member disposed on or in the plate member and axially disposed about an opening in the plate forming the first bore; (v) a second sealing member disposed on or in the plate member and axially disposed about an opening in the plate forming the second bore; (vi) a laser transparent window sealingly engaging a portion of the plate, wherein the window is disposed on an opposing side of the first and second bores relative to the first and second sealing members, wherein the window permits the passage of laser energy through the plate via the first and second bores; (vii) a first gas line coupling member in fluid communication with the first bore; and (viii) a second gas line coupling member in fluid communication with the second bore. The system further comprises (i) a source of analyte gas operably coupleable to the first gas line coupling member, and (ii) a gas analyzer operably coupleable to the second gas line coupling member.

A thirteenth aspect is a system according to the twelfth aspect, further comprising electronics operably coupled to the gas analyzer, wherein the electronics are configured to determine whether the percentage or amount of the analyte gas in gas exiting the device outlet meets or exceeds a predetermined threshold based on data from the gas analyzer.

A fourteenth aspect is a system according to the twelfth or thirteenth aspect, further comprising (i) a first gas flow meter configured to be in communication with the analyte gas source upstream of the device inlet to measure gas flow, and (ii) a second gas flow meter configured to be in communication with the analyte gas source downstream of the device outlet to measure gas flow.

A fifteenth aspect is a system according to the fourteenth aspect, further comprising electronics operably coupled to the first and second gas flow meters, wherein the electronics are configured to determine whether the flow of gas measured by the second gas flow meter is within a predetermined range of the flow of gas measured by the first gas flow meter.

A sixteenth aspect is a system according to any of aspects 12-15, further comprising a laser welder configured to move relative to the fixture to deliver laser energy through the first bore and to deliver laser energy through the second bore.

A seventeenth aspect is a system according to any of aspects 12-16, further comprising the implantable medical device.

An eighteenth aspect is a system that includes a fixture for use in introducing an analyte gas into a cavity of an implantable medical device, the device or a portion thereof forming the cavity and having an inlet and outlet in fluid communication with the cavity, wherein the fixture comprises a first gas line coupling member; and a second gas line coupling member. The fixture is configured to sealingly engage the device, to fluidly couple the inlet to the first gas line coupling member, and to fluidly couple the outlet to the second gas line coupling member. The system further includes a gas analyzer operably coupleable to the second gas line coupling member.

A nineteenth aspect is a system according to the eighteenth aspect, further comprising a source of analyte gas operably coupleable to the first gas line coupling member.

A twentieth aspect is a system according to the eighteenth or nineteenth aspect, further comprising electronics operably coupled to the gas analyzer, wherein the electronics are configured to determine whether the percentage or amount of the analyte gas in gas exiting the device outlet meets or exceeds a predetermined threshold based on data from the gas analyzer.

Thus, embodiments of FILLING IMPLANTABLE MEDICAL DEVICE FOR LEAK CHECKING are disclosed. One skilled in the art will appreciate that the leads, devices such as signal generators, systems and methods described herein can be practiced with embodiments other than those disclosed. The disclosed embodiments are presented for purposes of illustration and not limitation. One will also understand that components of the leads depicted and described with regard the figures and embodiments herein may be interchangeable.

What is claimed is:

1. A method comprising:
   providing an implantable medical device, or a portion thereof, to be hermetically sealed, the device or portion thereof forming a cavity and having an inlet and outlet in fluid communication with the cavity, wherein the device or portion thereof forming the cavity is putatively hermetically sealed except for the inlet and the outlet;
   analyzing gas that exits the cavity through the outlet; and
   introducing an analyte gas into the cavity via the inlet until the composition of the gas exiting the cavity via the outlet comprises a predetermined percent or amount of the analyte gas.

2. A method according to claim 1, wherein analyzing the gas that exits the cavity through the outlet comprises monitoring the composition of the gas via an instrument that measures thermal conductivity of the gas.

3. A method according to claim 1, further comprising putatively sealing the inlet and the outlet if the composition of the gas exiting the cavity is determined to have met or exceeded the predetermined threshold percentage or amount of analyte gas.

4. A method according to claim 3, wherein the outlet is sealed while the inlet is in communication with a source of the analyte gas.

5. A method according to claim 3, wherein the inlet and the outlet are sealed via laser welding.

6. A method according to claim 3, further comprising:
   subjecting the device with the sealed inlet and outlet to leak testing to determine whether the device or portion thereof is hermetically sealed.

7. A method according to claim 6, wherein the leak testing comprises monitoring for the presence of the analyte gas external to the device.

8. A method according to claim 1, further comprising monitoring flow of gas upstream of the inlet;
   monitoring flow of gas downstream of outlet; and
   determining whether the flow of gas downstream of the outlet is within a predetermined range of the flow of gas upstream of the inlet.

9. A method according to claim 8, further comprising stopping the introduction of the analyte gas into the cavity if the flow of gas downstream of the outlet is not within a predetermined range of the flow of gas upstream of the inlet.

10. A method according to claim 1, further comprising
determining whether the analyte gas has been introduced into the cavity via the inlet for a predetermined amount of time; and
stopping the introduction of the analyte gas into the cavity if the predetermined amount of time has been determined to have passed and if the composition of the gas exiting the cavity does not comprise the predetermined percent or amount of the analyte gas.

11. A non-transitory computer readable medium comprising instructions that, when implemented, cause a system to carry out a method according to any one of the preceding claims, wherein the system comprises:
a source containing the analyte gas;
a gas analyzer;
an optional first gas flow meter configured to be positioned upstream of the device inlet;
an optional second gas flow meter configured to be positioned downstream of the device outlet; and
an optional laser to weld the inlet and the outlet to seal the inlet and the outlet.

12. A system comprising:
fixture for use in introducing an analyte gas into a cavity of an implantable medical device, the device or a portion thereof forming the cavity and having an inlet and outlet in fluid communication with the cavity, wherein the fixture comprises:
a plate member,
a first bore in the plate member; wherein the first bore is configured to be aligned with the device inlet;
a second bore in the plate member, wherein the second bore is configured to be aligned with the device outlet;
a first sealing member disposed on or in the plate member and axially disposed about an opening in the plate forming the first bore;
a second sealing member disposed on or in the plate member and axially disposed about an opening in the plate forming the second bore;
a laser transparent window sealingly engaging a portion of the plate, wherein the window is disposed on an opposing side of the first and second bores relative to the first and second sealing members, wherein the window permits the passage of laser energy through the plate via the first and second bores;
a first gas line coupling member in fluid communication with the first bore; and
a second gas line coupling member in fluid communication with the second bore; and
(ii) a source of analyte gas operably coupleable to the first gas line coupling member; and
(iii) a gas analyzer operably coupleable to the second gas line coupling member.

13. A system according to claim 12, further comprising electronics operably coupled to the gas analyzer, wherein the electronics are configured to determine whether the percentage or amount of the analyte gas in gas exiting the device outlet meets or exceeds a predetermined threshold based on data from the gas analyzer.

14. A system according to claim 12, further comprising:
a first gas flow meter configured to be in communication with the analyte gas source upstream of the device inlet to measure gas flow; and
a second gas flow meter configured to be in communication with the analyte gas source downstream of the device outlet to measure gas flow.

15. A system according to claim 14, further comprising electronics operably coupled to the first and second gas flow meters, wherein the electronics are configured to determine whether the flow of gas measured by the second gas flow meter is within a predetermined range of the flow of gas measured by the first gas flow meter.

16. A system according to claim 12, further comprising a laser welder configured to move relative to the fixture to deliver laser energy through the first bore and to deliver laser energy through the second bore.

17. A system comprising:
(i) a fixture for use in introducing an analyte gas into a cavity of an implantable medical device, the device or a portion thereof forming the cavity and having an inlet and outlet in fluid communication with the cavity, wherein the fixture comprises a first gas line coupling member; and a second gas line coupling member, and wherein the fixture is configured to sealingly engage the device, to fluidly couple the inlet to the first gas line coupling member, and to fluidly couple the outlet to the second gas line coupling member; and
(ii) a gas analyzer operably coupleable to the second gas line coupling member.

18. A system according to claim 17, further comprising a source of analyte gas operably coupleable to the first gas line coupling member.

19. A system according to claim 17, further comprising electronics operably coupled to the gas analyzer, wherein the electronics are configured to determine whether the percentage or amount of the analyte gas in gas exiting the device outlet meets or exceeds a predetermined threshold based on data from the gas analyzer.

* * * * *